US012167187B2

(12) United States Patent
Kamp et al.

(10) Patent No.: US 12,167,187 B2
(45) **Date of Patent: *Dec. 10, 2024**

(54) QUICK CONNECT SPEAKER ASSEMBLIES AND RELATED SYSTEMS AND METHODS

(71) Applicant: Snap One, LLC, Lehi, UT (US)

(72) Inventors: Matthew Phillip Kamp, Charlotte, NC (US); Gordon Charles Van Kessel, Colborne (CA); Meguerditch John Tchilinguirian, Bowmanville (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,366

(22) Filed: Jul. 11, 2023

(65) Prior Publication Data

US 2023/0353918 A1 Nov. 2, 2023

Related U.S. Application Data

(63) Continuation of application No. 16/415,465, filed on May 17, 2019, now Pat. No. 11,750,957.

(60) Provisional application No. 62/673,277, filed on May 18, 2018.

(51) Int. Cl.
*H04R 1/02* (2006.01)

(52) U.S. Cl.
CPC .................................... *H04R 1/02* (2013.01)

(58) Field of Classification Search
None
See application file for complete search history.

(56) References Cited

U.S. PATENT DOCUMENTS 11,750,957 B2 * 9/2023 Kamp .................... H04R 1/026 381/394

* cited by examiner

*Primary Examiner* — Walter F Briney, III

(57) ABSTRACT

A quick connect speaker assembly includes: a speaker; a coupler configured to be coupled to the speaker; and a stake including a body having first and second end portions and defining a channel, with the first end portion including an attachment feature. The stake is configured to slidably receive the coupler in the channel at the first end portion and the attachment feature is configured to attach the coupler and the speaker to the stake in an installed position.

11 Claims, 14 Drawing Sheets

QUICK CONNECT SPEAKER ASSEMBLIES AND RELATED SYSTEMS AND METHODS

RELATED APPLICATIONS

This application claims priority from U.S. Provisional Application No. 62/673,277, filed May 18, 2018, the disclosure of which is incorporated by reference in its entirety.

BACKGROUND

This invention aims to address the problem that many dealers have when installing low voltage appliances outdoors. Because of the outdoor nature of the install and the wiring topology needed for, e.g., a speaker system, management of the wire during and after install are important things to consider.

SUMMARY

Some embodiments of the present invention are directed to a quick connect speaker assembly. The assembly includes: a speaker; a coupler configured to be coupled to the speaker; and a stake including a body having first and second end portions and defining a channel, with the first end portion including an attachment feature. The stake is configured to slidably receive the coupler in the channel at the first end portion and the attachment feature is configured to attach the coupler and the speaker to the stake in an installed position.

Some other embodiments of the present invention are directed to a system. The system includes a plurality of quick connect speaker assemblies. Each quick connect speaker assembly includes: a speaker; a coupler configured to be coupled to the speaker; a stake comprising a body having first and second end portions and defining a channel, the first end portion comprising an attachment feature. The stake is configured to slidably receive the coupler in the channel at the first end portion and the attachment feature is configured to attach the coupler and the speaker to the stake in an installed position. First and second spaced apart gaps are defined between the coupler and the stake in the installed position. The system includes a plurality of system wires electrically connecting the plurality of speakers. For each quick connect speaker assembly, one of the plurality of system wires extends through the first gap and another one of the plurality of system wires optionally extends through the second gap.

Some other embodiments of the present invention are directed to a method. The method includes providing a quick connect speaker assembly including: a speaker including a body and a base; a coupler configured to be coupled to the speaker; and a stake including a body having first and second end portions and defining a channel, with the first end portion comprising an attachment feature. The stake is configured to slidably receive the coupler in the channel at the first end portion and the attachment feature is configured to attach the coupler and the speaker to the stake in an installed position. The method includes: connecting the coupler to the base of the speaker; connecting at least one system wire to conductors of the speaker optionally using at least one wire nut; driving the second end portion of the stake into the ground; positioning the conductors and optionally the at least one wire nut in the channel of the stake; connecting the speaker to the stake by connecting the coupler to the stake to thereby form first and second spaced apart gaps between the coupler and the stake; and either (i) routing the at least one system wire through the first gap and/or the second gap or (ii) routing the at least one system wire through an opening defined in the body of the stake.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1:
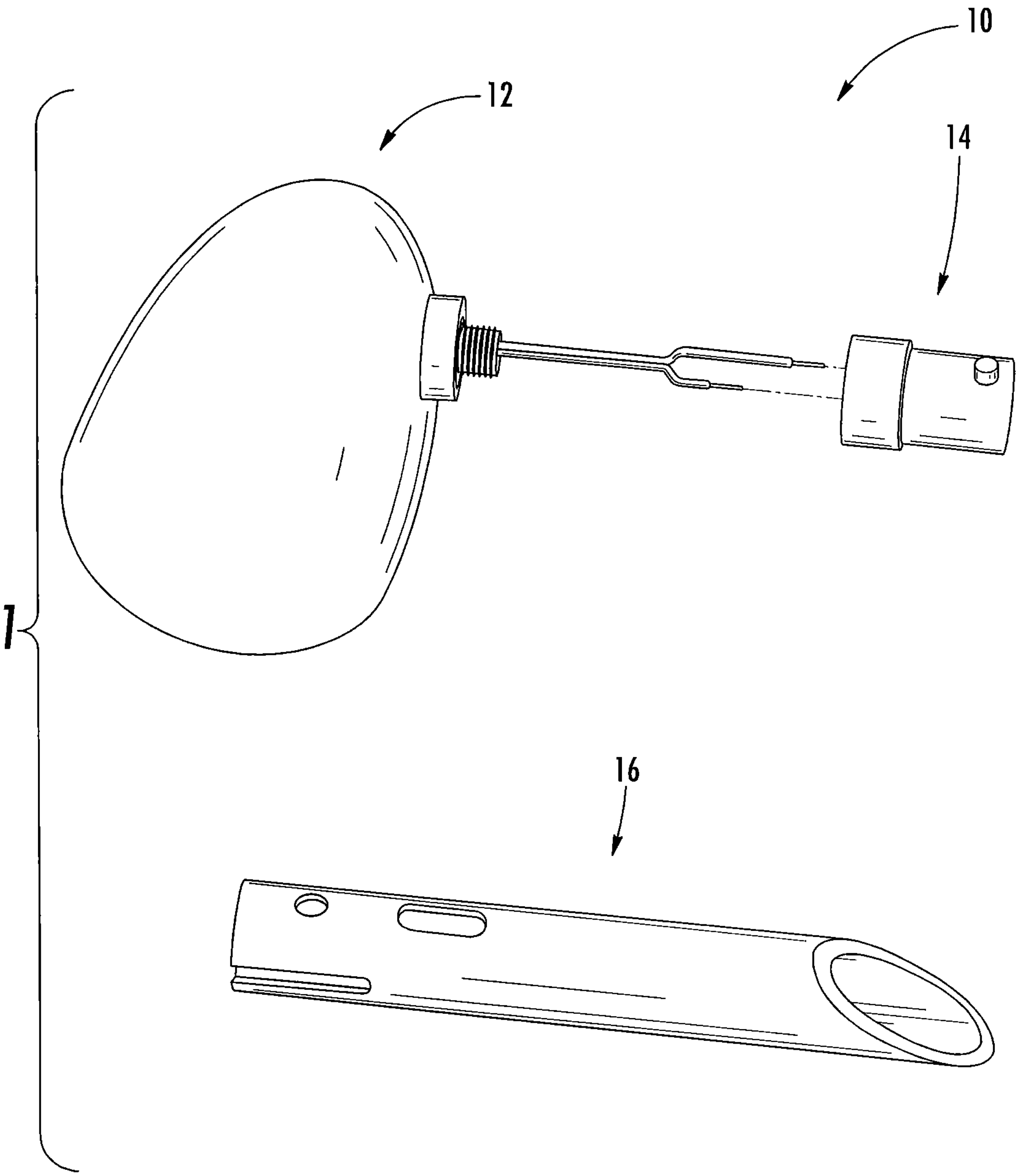
FIG. 1 is an exploded view of a quick connect speaker assembly according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being “coupled” or “connected” to another element, it can be directly coupled or connected to the other element or intervening elements may also be present. In contrast, when an element is referred to as being “directly coupled” or “directly connected” to another element, there are no intervening elements present. Like numbers refer to like elements throughout. As used herein the term “and/or” includes any and all combinations of one or more of the associated listed items.

In addition, spatially relative terms, such as “under,” “below,” “lower,” “over,” “upper” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A quick connect appliance or speaker assembly 10 according to some embodiments is illustrated in FIG. 1. The assembly 10 includes an appliance such as a speaker 12, a coupler 14, and a stake 16.

Figure 2:
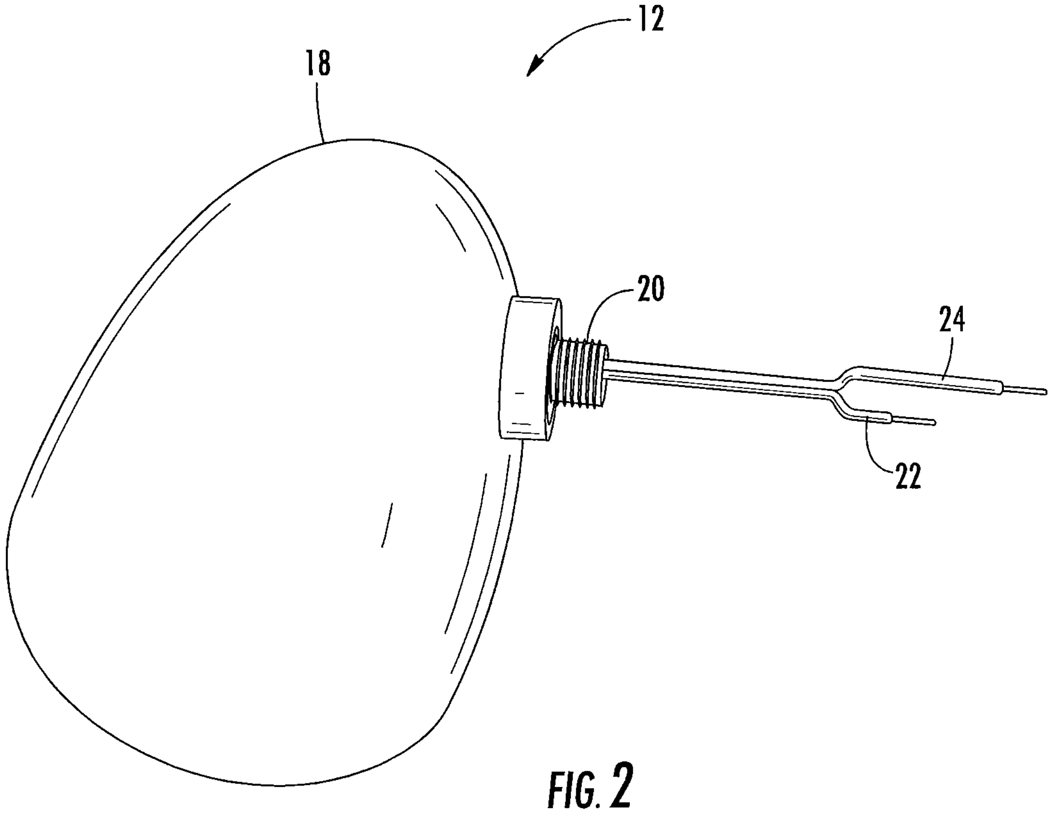
FIG. 2 is a perspective view of a speaker of the assembly of FIG. 1.

Referring to FIG. 2, the speaker 12 includes a body 18 and a base 20. The base 20 may be threaded for threading engagement with the coupler 14, as described in more detail below. The speaker 12 includes first and second conductors 22, 24 that may extend from the body 18 and through the base 20.

Figure 3:
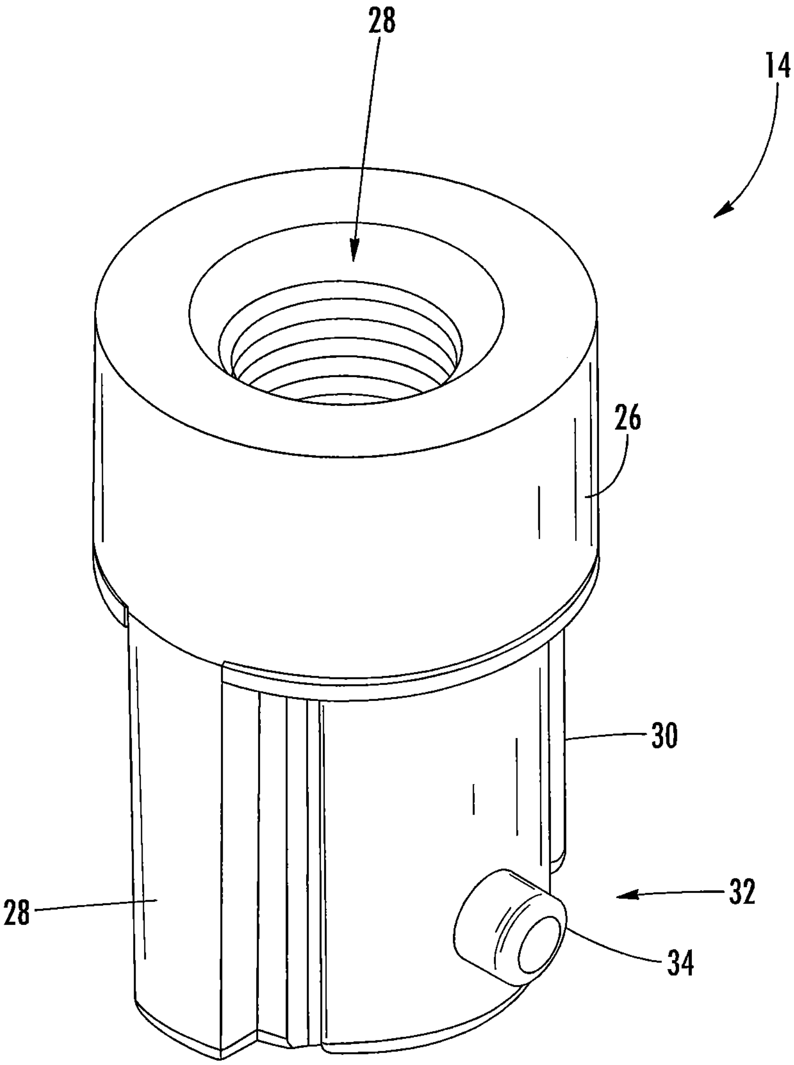
FIG. 3 is a perspective view of a coupler of the assembly of FIG. 1.
Figure 4:
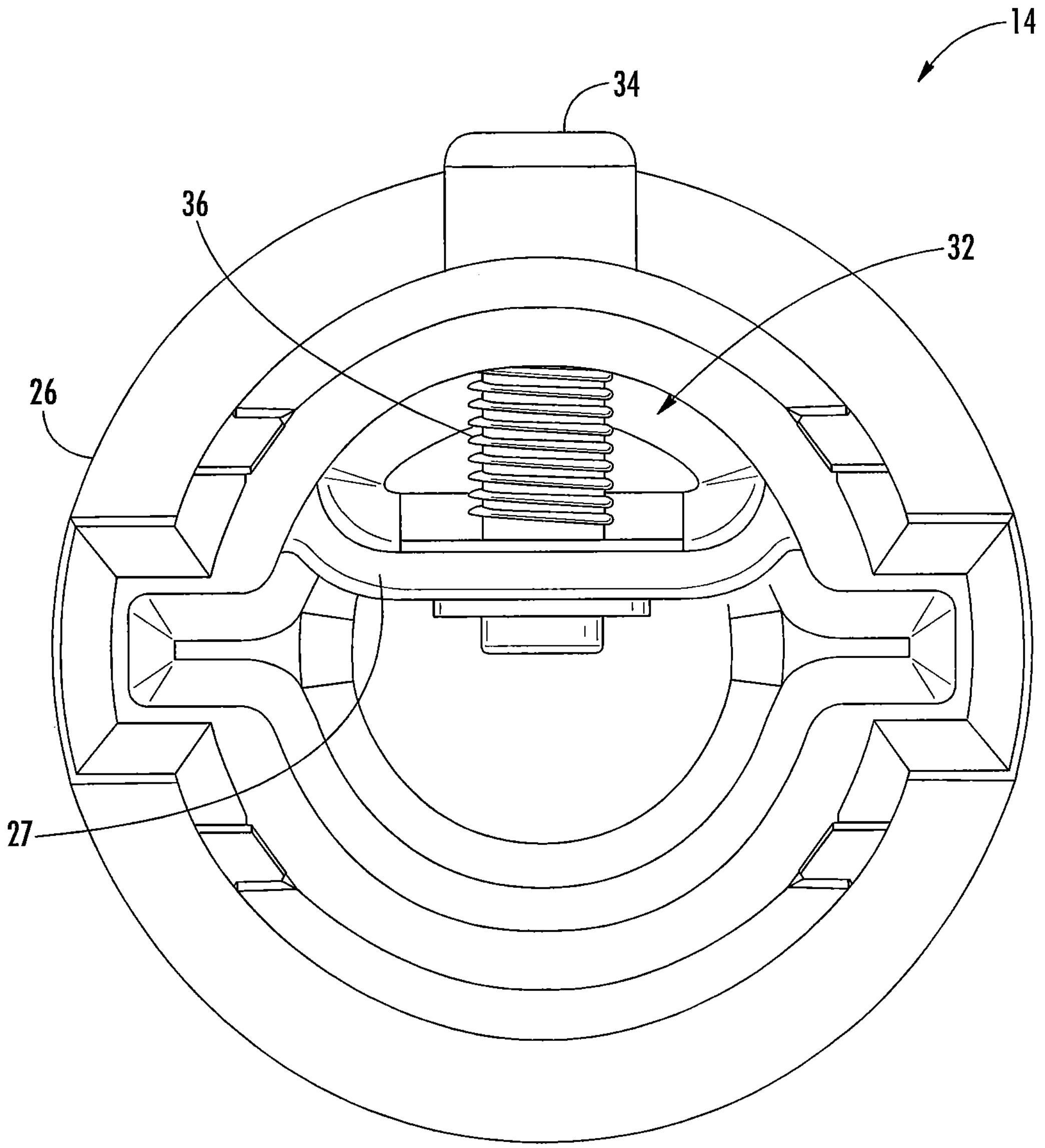
FIG. 4 is a bottom view of the coupler of FIG. 3.

The coupler 14 is shown in greater detail in FIGS. 3 and 4. The coupler 14 includes a body 26 that defines a channel 28. The channel 28 may be threaded for threading engagement with the base 20 of the speaker 12 (FIG. 2). The body 26 may include first and second raised portions or guides 28, 30. The first and second raised portions 28, 30 may be diametrically opposed.

The coupler 14 includes a push pin or push pin assembly 32. The push pin assembly 32 may include a pin or plunger 34 and a spring 36. The spring may be held between the body 26 and a stop 27 in the channel 28 (with the stop 27 being integrated with or coupled to the body 26). The spring 36 may bias the plunger 34 outwardly to the position shown in FIGS. 3 and 4. A user may push the plunger 34 inwardly so that the coupler 14 can be received inside the stake 16, as described in more detail below.

Figure 5:
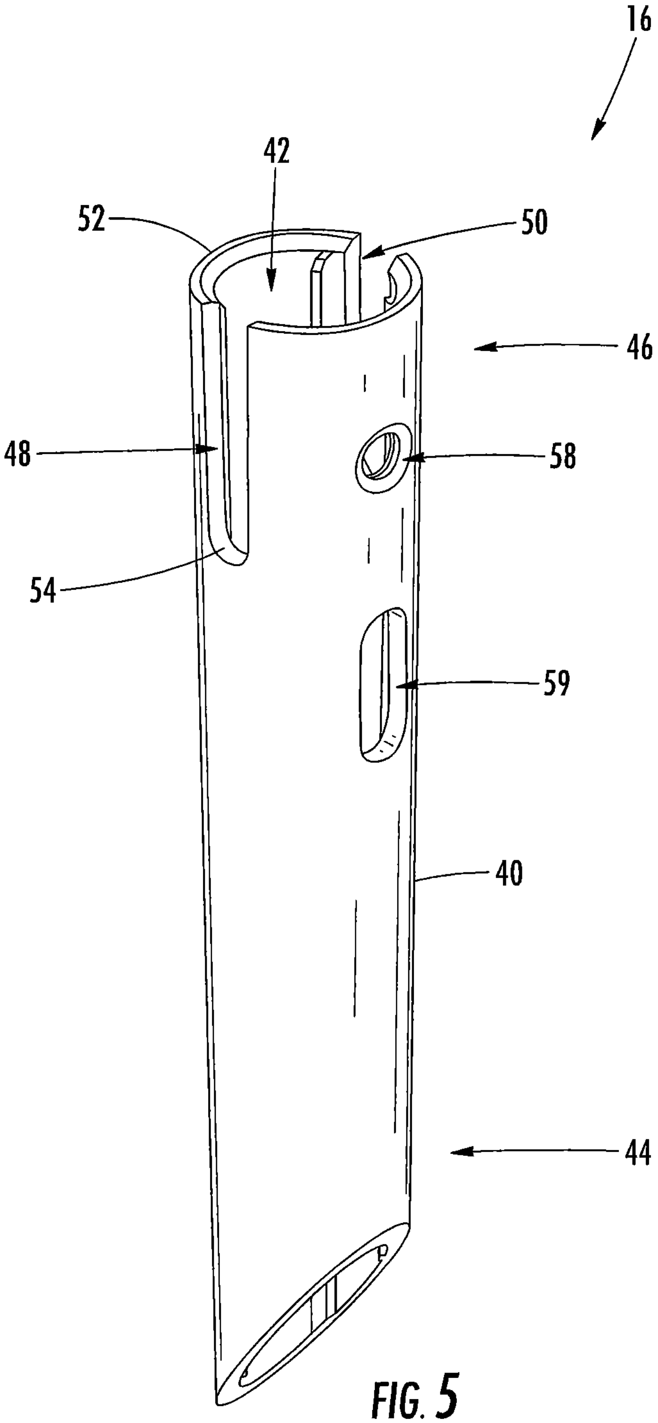
FIG. 5 is a perspective view of a stake of the assembly of FIG. 1.

Referring to FIG. 5, the stake 16 includes a body 40 that defines a channel 42. The stake 16 defines a longitudinal axis. The body 40 includes first and second opposite end portions 44, 46. The first end portion 44 is configured to be driven into a surface such as the ground. First and second slots 48, 50 are at the second end portion 46. The first and second slots 48, 50 extend from a second end 52 of the stake 16 and terminate at respective first and second edges 54, 56 (see FIG. 7 for the second edge 56).

A hole 58 is defined in the body 40 at the second end portion 46. An opening 59 is defined in the body 40. Burial or system wires may be received through the opening 59, as described in more detail below.

Figure 6:
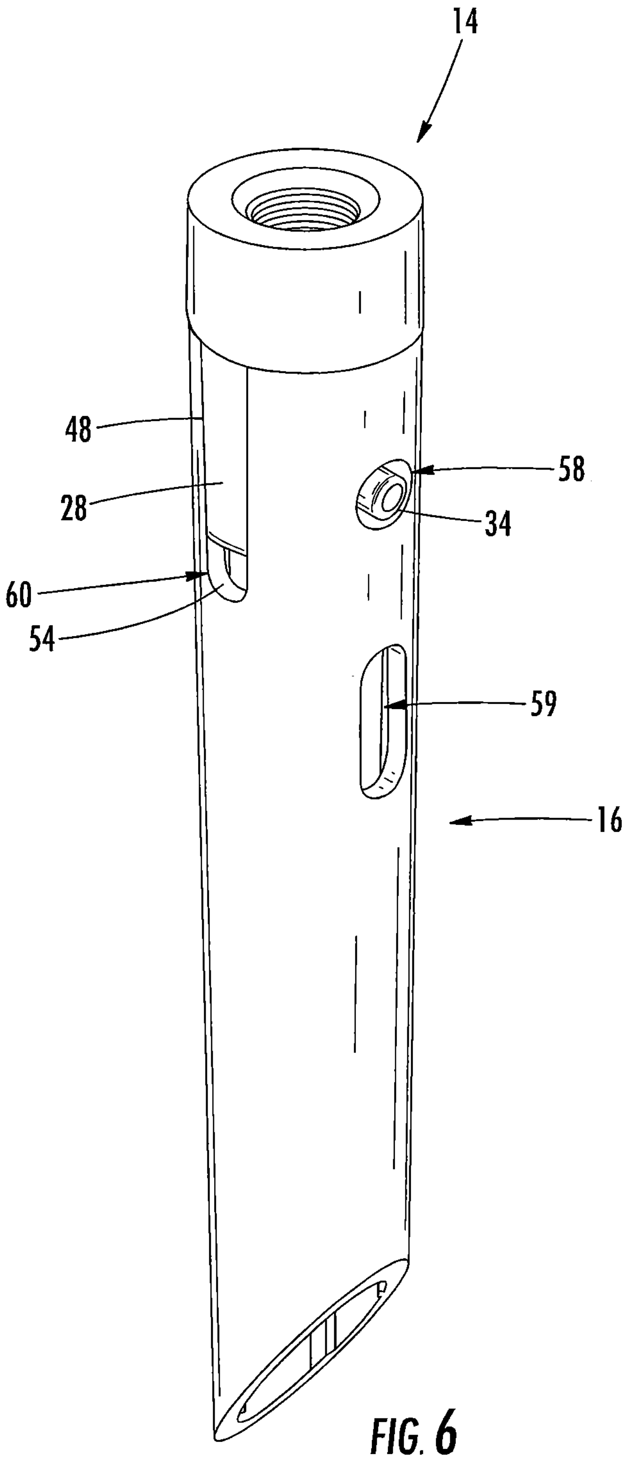
FIG. 6 is a perspective view of the stake of FIG. 5 with the coupler of FIG. 3 connected thereto.
Figure 7:
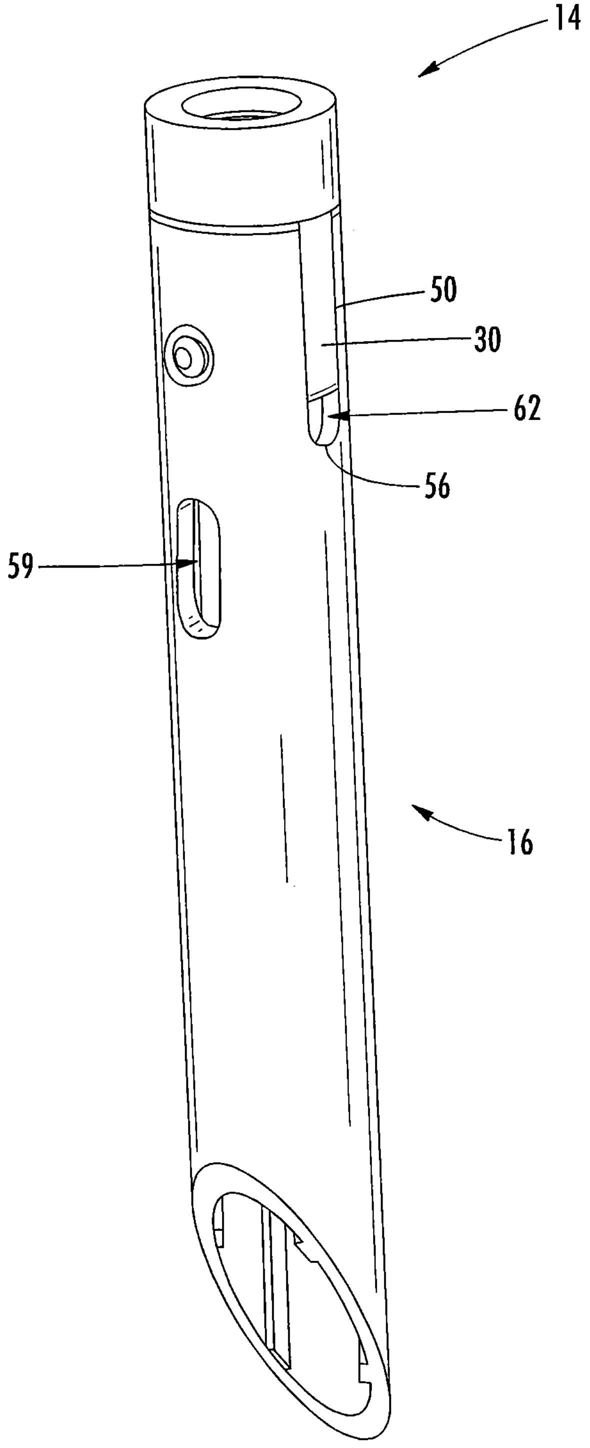
FIG. 7 is another perspective view of the stake of FIG. 5 with the coupler of FIG. 3 connected thereto.

FIGS. 6 and 7 illustrate the coupler 14 received in the channel 42 of the stake 16 (FIG. 5). A user may depress the plunger 34 so that the body 26 of the coupler 14 (FIG. 3) is slidable into the channel 42. The plunger 34 may extend out of the hole 58 with the coupler 14 in an installed position shown in FIGS. 6 and 7. The plunger 34 may be urged by the spring 36 (FIG. 4) to extend out of the hole 58.

The guides 28, 30 may be received in the slots 48, 50. In this way, the guides 28, 30 and/or the slots 48, 50 may serve as alignment features when inserting the coupler 14 into the stake 16. The engagement of the guides 28, 30 and the slots 48, 50 may also provide a more robust mechanical connection for the coupler 14 and the speaker 12 when the coupler 14 is in the installed position in the stake 16.

The first slot 48 may define a first gap 60 between the first edge 54 and the first guide 28 of the coupler 14. The second slot 50 may define a second gap 62 between the second edge 56 and the second guide 30 of the coupler 14. Burial or system wires may be routed through the first gap 60 and/or the second gap 62, as described in more detail below.

Figure 8:
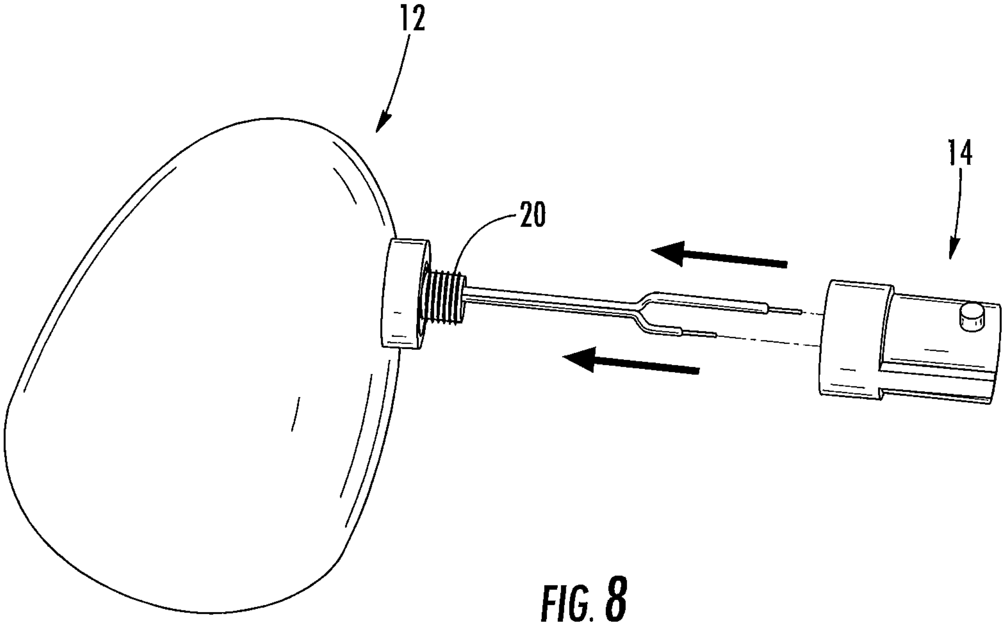
FIGS. 8 and 9 illustrate connecting the coupler of FIG. 3 to the speaker of FIG. 2.
Figure 9:
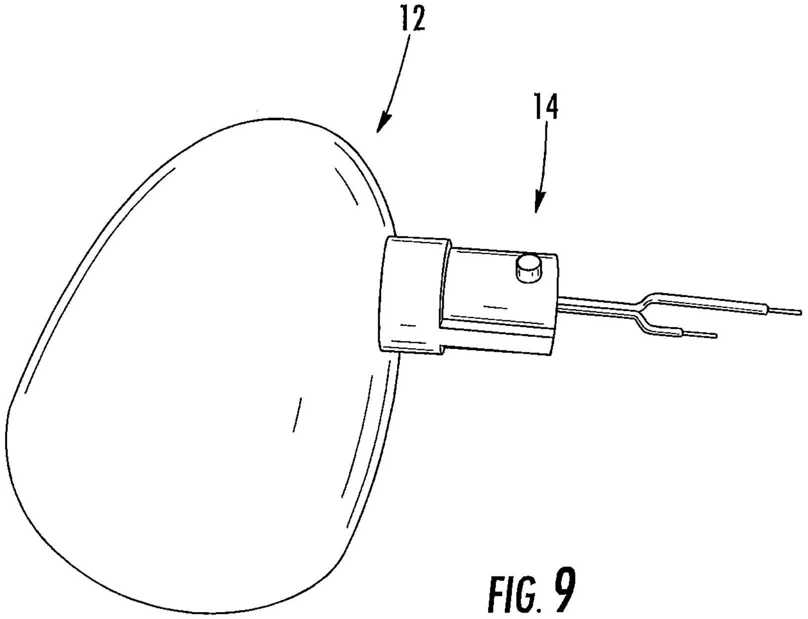

Example installation steps using the assembly 10 will now be described with reference to FIGS. 8-14. Referring first to FIGS. 8 and 9, the coupler 14 is attached to the speaker 12. For example, the coupler 14 may be threadingly engaged with the base 20 of the speaker 12.

Figure 10:
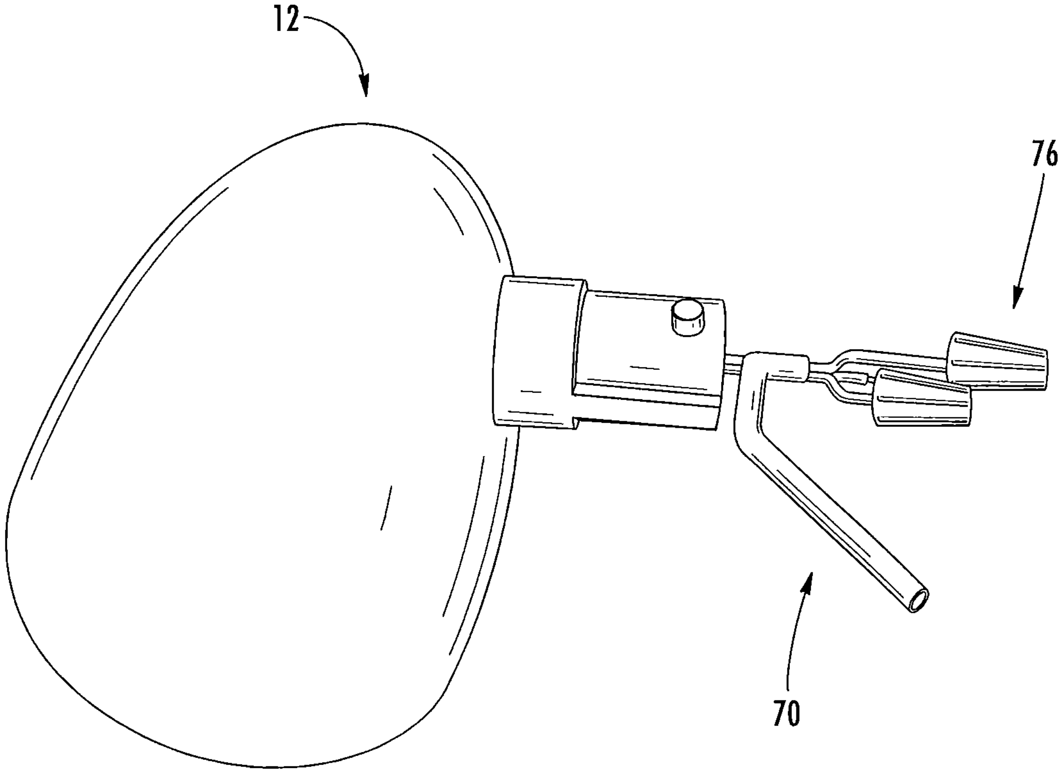
FIG. 10 illustrates wiring a system wire to wires of the speaker and coupler of FIG. 9 (independent of the stake).

Referring to FIG. 10, the speaker 12 is wired into the overall system independent of the stake. For example, one or more burial or system wires 70 may be connected to the first and second conductors 22, 24 of the speaker 12 (FIG. 2). Wire nuts 76 may be used to make the connection.

Figure 11:
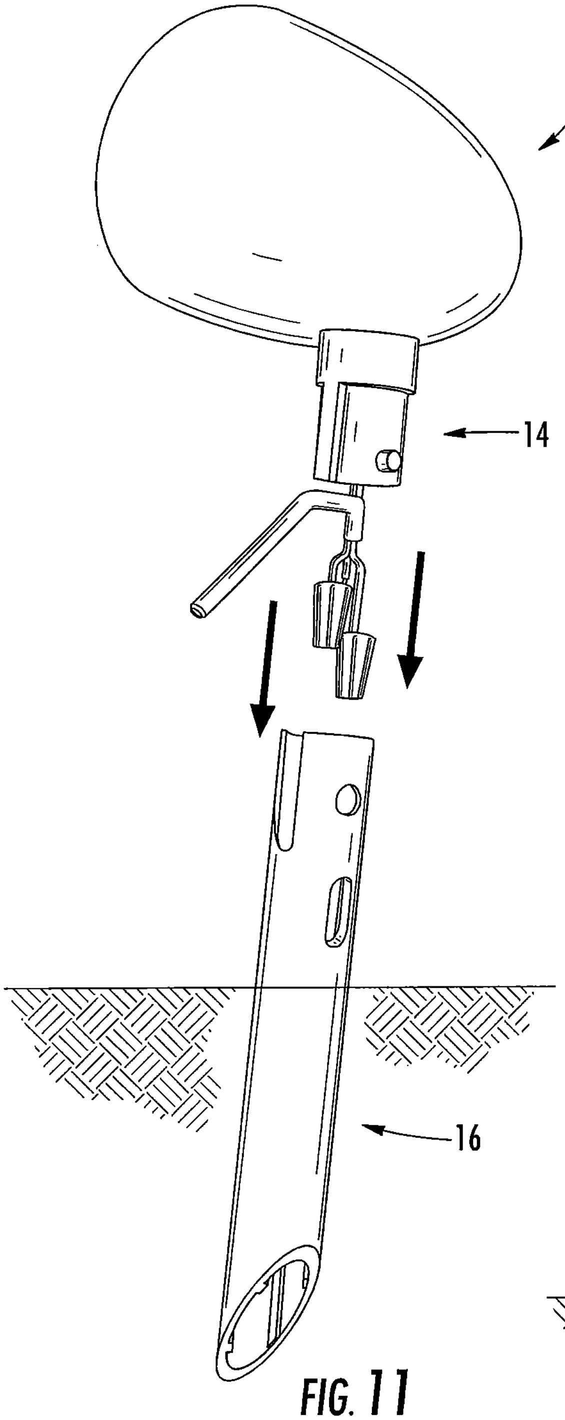
FIGS. 11-13 sequentially illustrate installing the speaker and coupler of FIG. 9 into the stake of FIG. 5 with the stake already in the ground.
Figure 12:
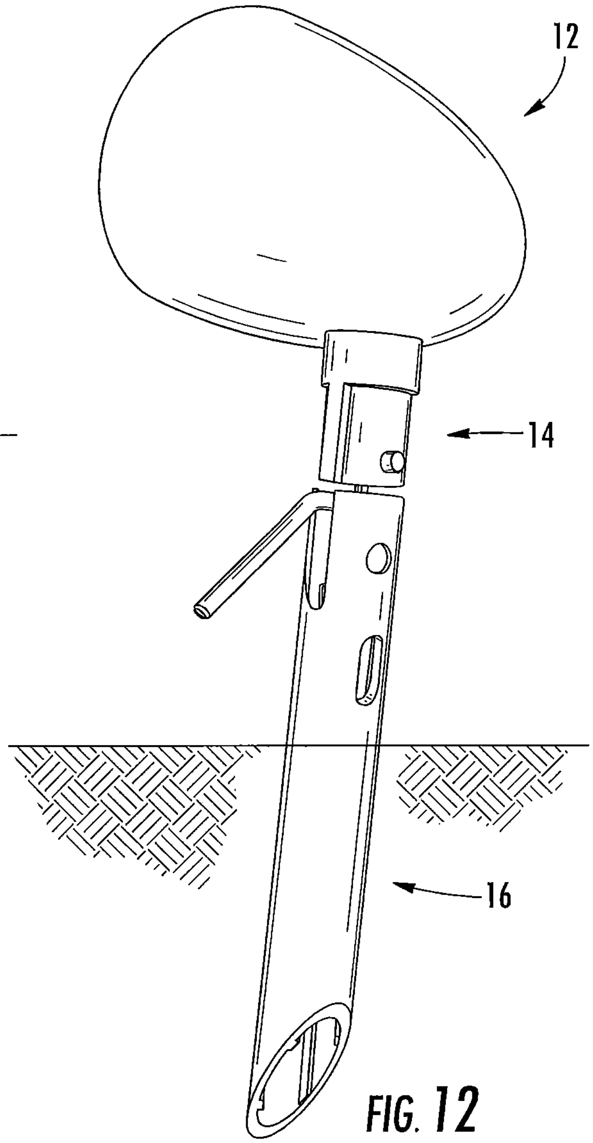
Figure 13:
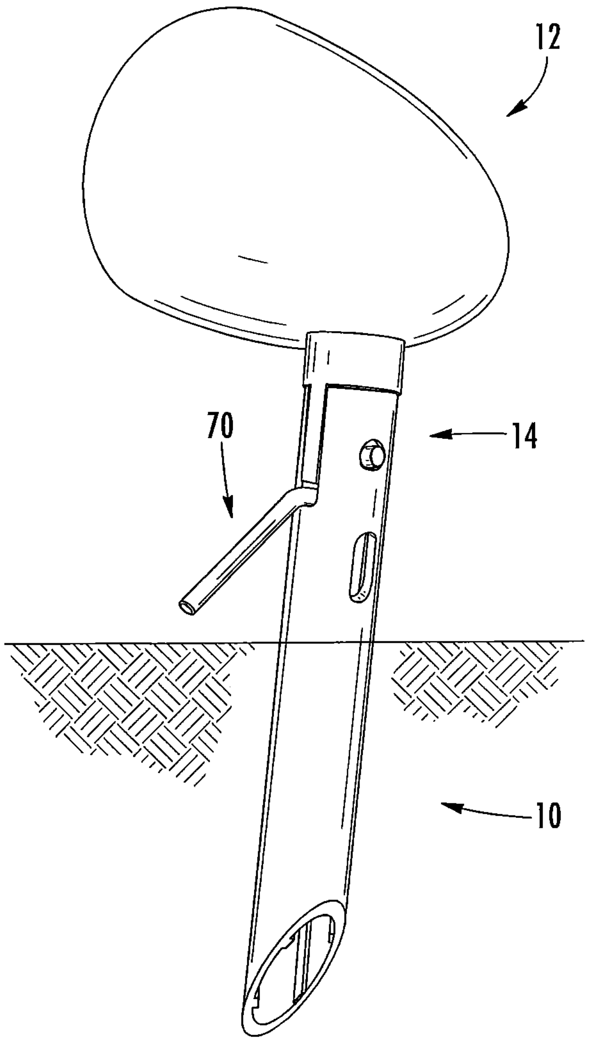

Referring to FIGS. 11 and 12, with the stake 16 in the ground, the speaker 12 is attached to the stake 16 by receiving the coupler 14 in the channel 42 of the stake 16 (FIG. 5). The wire nuts 76 are received in the channel 42. The installer may depress the plunger 34 such that the body 26 of the coupler 14 (FIG. 3) is slidable into the channel 42 of the stake 16. The guides 28, 30 of the coupler 14 may be received in the slots 48, 50 of the stake 16 (FIGS. 6 and 7). FIG. 13 shows the speaker 12 and/or the coupler 14 in the installed position on the stake 16. In the installed position, the plunger 34 may be urged by the spring 36 (FIG. 4) to extend out of the hole 58 to help lock the speaker 12 and the coupler 14 in place.

Figure 14:
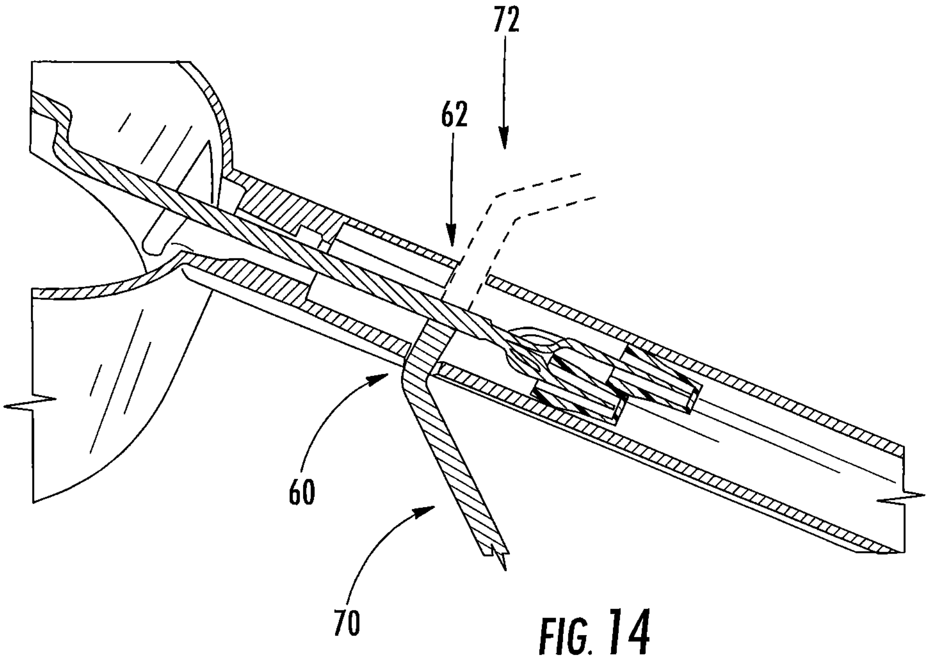
FIG. 14 is a perspective sectional view illustrating the assembly of FIG. 1 in an assembled state with the wiring connection points in the stake.
Figure 15:
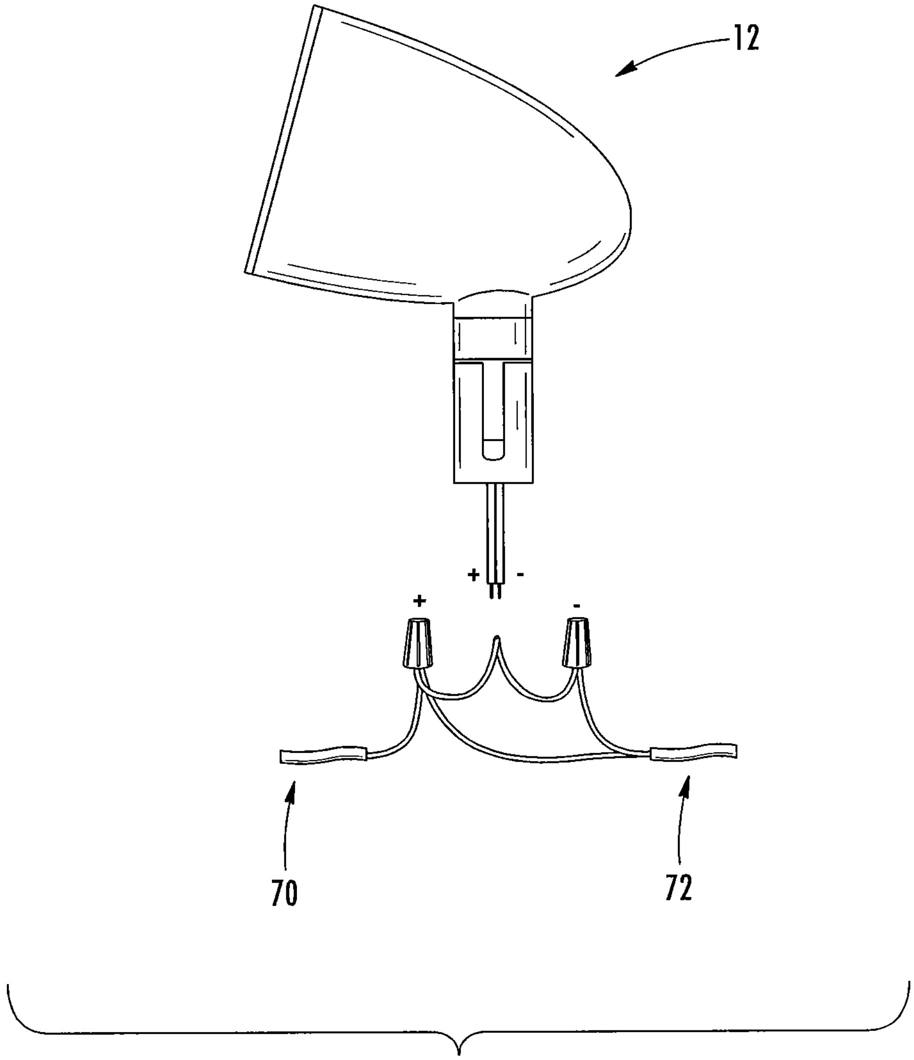
FIG. 15 is a wiring diagram for the assembly of FIG. 1.

With the speaker 12 and/or the coupler 14 in the installed position on the stake 16, the burial or system wire 70 may be routed through the first gap 60. In some embodiments, the burial or system wire 70 is a first burial or system wire and a second burial or system wire 72 is used and is routed through the second gap 62. For example, the first burial or system wire 70 may extend from an amplifier or a previous speaker in the overall system to the speaker 12 and the second burial or system wire 72 may extend from the speaker 12 to a next speaker in the overall system. FIGS. 13-15 show this configuration.

Figure 16:
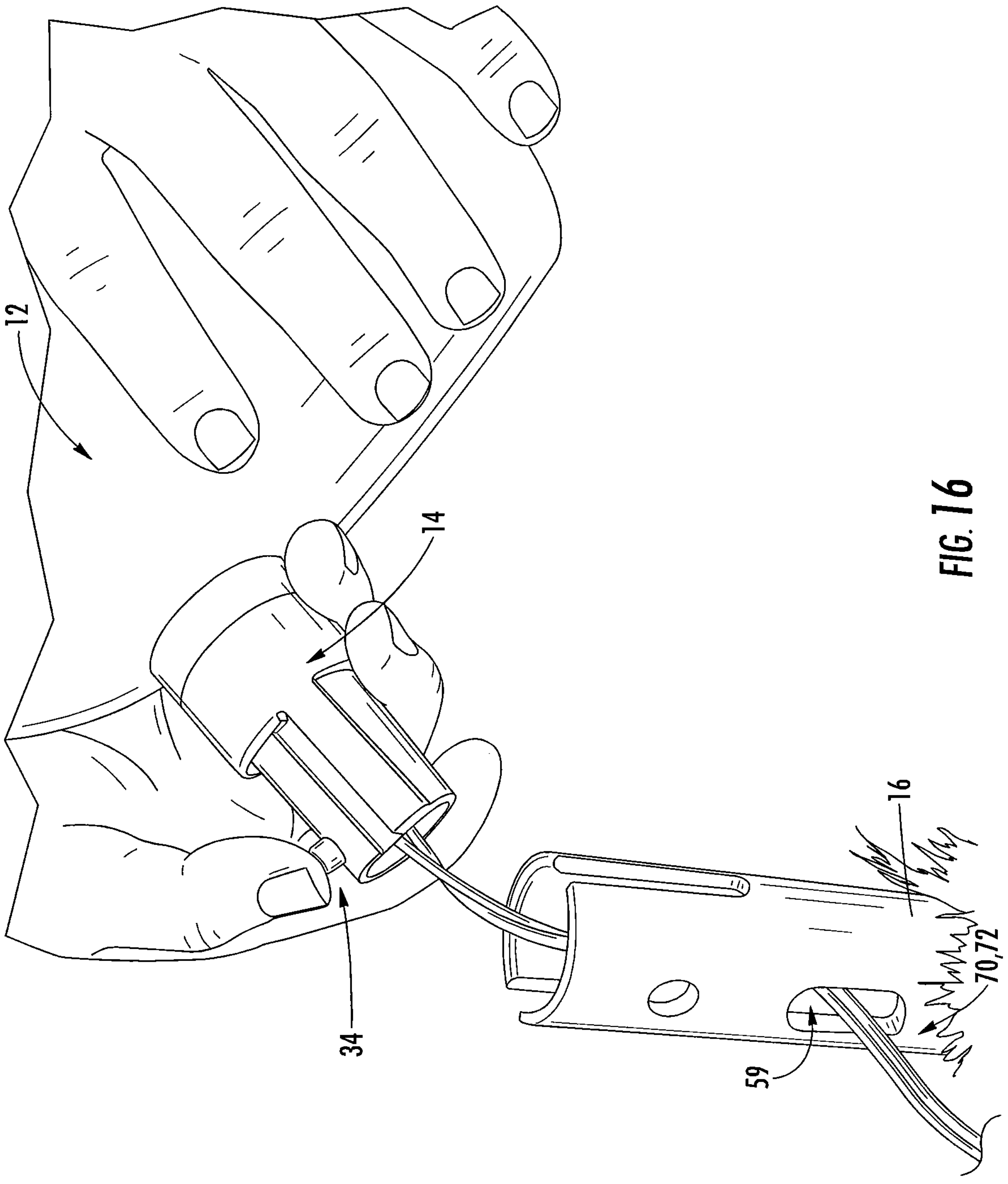
FIG. 16 is a perspective view illustrating installing the speaker and coupler of FIG. 9 into the stake of FIG. 5 with the stake already in the ground.

It is noted that the burial or system wire(s) may alternatively be routed through the opening 59 defined in the body 40 of the stake 16. This configuration is illustrated in FIG. 16.

Embodiments of the present invention provide a connection assembly and method in which a speaker attaches to a ground stake while also including many key design features to solve pain points installers have during traditional installs. Tool-less design, wire management, ease of installation and replacement are a few of the advantages provided by this design.

This design allows installers to complete wiring prior to the speaker being installed on the stake. This design also allows installers to install the stake into the ground prior to the speaker being installed. This design further allows installers to manage wires and to house the wiring and its connection points inside of the stake.

Typical outdoor appliances require the installer to twist the top component onto the stake that is in the ground prior to hooking up wires. This in turn results in twisted wires in the stake. Additionally, often an installer must place the stake on the speaker prior to install in the ground which results in difficulty with placing the stake in the ground or possible damage to the assembly. Further, installers often do not have options for where to place the wire connection points, which is often in line with the overall system (wire in and wire out to next appliance).

Embodiments of the present invention provide a quick connect speaker stake assembly that allows an installer to pre-run wiring where final placement of speakers are desired. Because of the nature of this invention, once wiring is run, the stake is able to be placed in the ground independent of the speaker or with wiring condition. This allows the installer to use whatever tools are necessary to get the stake in the ground without compromising the assembly of the system.

With the stake in the ground the installer then can wire the top part of the speaker into the system independent of the stake that is in the ground. Because of the unique design attributes, the installer can place the now-wired speaker onto the stake without having to perform any twisting or fishing of wires through the stake. The speaker simply slips over the top of the stake and secures in place with, for example, a push pin feature.

Again, due to the design features of the stake, the wiring can be routed on both sides of the stake for easy entry and exit for the previous and next speaker in the system. Because the wiring is being run through the stake the connection points for the wiring can be housed in the stake.

Overall, this design solves many pain points dealers have when installing these types of systems and can save valuable time during install. The benefits to the manufacturer are the ability to sell a unique feature as well as prevent product from failing in the field during install.

The value of this solution is that it saves the dealer time during install as well as pain and frustration over typical installs they would experience with other products. In addition to time, this solution would minimize the opportunity for product failure in the field and in turn allow dealers to have a higher percent chance of success during the initial install.

In addition to the design of the stake and speaker, this solution would allow dealers to use existing accessories they may already have.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

The invention claimed is:

1. An assembly unit for a quick connect speaker, the assembly unit comprising:
- a speaker body formed as a single body encasing a speaker appliance;
- a coupler formed as a single body connectable to the speaker body; and
- a stake formed as a single body having first and second end portions and defining a channel, the first end portion comprising an attachment feature,
- wherein the stake is configured to slidably receive the coupler in the channel at the first end portion and the attachment feature is configured to attach the coupler and the speaker body to the stake in an installed position,
- wherein the speaker body is directly connected to the coupler and the coupler is directly connected to the stake, and
- wherein the speaker body, the coupler, and the stake form an entirety of an outer surface of the quick connect speaker assembly.

2. The assembly unit of claim 1, wherein the channel is configured to receive wires of the speaker body in the installed position.

3. The assembly unit of claim 1, wherein the coupler comprises a push pin and the attachment feature comprises a hole defined in the stake and configured to receive the push pin in the installed position.

4. The assembly unit of claim 1, wherein the coupler comprises first and second spaced apart raised portions and the stake comprises first and second spaced apart slots at the first end portion that are configured to receive the first and second raised portions, respectively, in the installed position.

5. The assembly unit of claim 4, wherein the first slot terminates at a first edge and the second slot terminates at a second edge, and wherein, with the coupler and the speaker body attached to the stake in the installed position:
- a first gap is defined by the first slot between the first edge and the first raised portion; and
- a second gap is defined by the second slot between the second edge and the second raised portion.

6. The assembly unit of claim 5, wherein the first gap is configured to receive a first system wire therethrough, and wherein the second gap is configured to receive a second system wire therethrough.

7. The assembly unit of claim 1, wherein the body has an opening defined therein that is configured to receive a first system wire therethrough and/or a second system wire therethrough.

8. A system comprising:
- a plurality of quick connect speaker assemblies each comprising:

a speaker body formed as a single body encasing a speaker appliance;

a coupler formed as a single body connectable to the speaker body; and a stake formed as a single body having first and second end portions and defining a channel, the first end portion comprising an attachment feature, wherein the stake is configured to slidably receive the coupler in the channel at the first end portion and the attachment feature is configured to attach the coupler and the speaker body to the stake in an installed position, wherein first and second spaced apart gaps are defined between the coupler and the stake in the installed position, wherein the speaker body is directly connected to the coupler and the coupler is directly connected to the stake, wherein the speaker body, the coupler, and the stake form an entirety of an outer surface of the quick connect speaker assembly; and a plurality of system wires electrically connecting the plurality of speakers, wherein, for each quick connect speaker assembly, one of the plurality of system wires extends through the first gap and another one of the plurality of system wires optionally extends through the second gap.

9. The system of claim 8 wherein:

each stake comprises an opening defined therein; and at least one of the plurality of system wires extends through the opening.

10. A method for assembling a speaker system, the method comprising:

providing a quick connect speaker assembly comprising:

a speaker body formed as a single body encasing a speaker appliance and including a base;

a coupler formed as a single body connectable to the speaker body; and a stake formed as a single body having first and second end portions and defining a channel, the first end portion comprising an attachment feature, wherein the stake is configured to slidably receive the coupler in the channel at the first end portion and the attachment feature is configured to attach the coupler and the speaker body to the stake in an installed position, wherein the speaker body is directly connected to the coupler and the coupler is directly connected to the stake, and wherein the speaker body, the coupler, and the stake form an entirety of an outer surface of the quick connect speaker assembly;

connecting the coupler to the base of the speaker body;

connecting at least one system wire to conductors of the speaker body optionally using at least one wire nut;

driving the second end portion of the stake into the ground;

positioning the conductors and optionally the at least one wire nut in the channel of the stake;

connecting the speaker body to the stake by connecting the coupler to the stake to thereby form first and second spaced apart gaps between the coupler and the stake; and routing the at least one system wire through any of: (1) any of the first gap and the second gap; and (2) an opening defined in the body of the stake.

11. The method of claim 10 wherein the stake defines a longitudinal axis, and wherein connecting the coupler to the stake comprises advancing the coupler into the stake in an axial direction and without rotating the coupler relative to the stake.

* * * * *